United States Patent
Birru et al.

(10) Patent No.: US 9,651,416 B2
(45) Date of Patent: May 16, 2017

(54) FAULT DETECTION, LOCALIZATION AND PERFORMANCE MONITORING OF PHOTOSENSORS FOR LIGHTING CONTROLS

(71) Applicant: PHILIPS LIGHTING HOLDING B.V., Eindhoven (NL)

(72) Inventors: Dagnachew Birru, Yorktown Height, NY (US); Tianqi Wang, Rochester, NY (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 404 days.

(21) Appl. No.: 14/391,262

(22) PCT Filed: Apr. 4, 2013

(86) PCT No.: PCT/IB2013/052698
§ 371 (c)(1),
(2) Date: Oct. 8, 2014

(87) PCT Pub. No.: WO2013/153490
PCT Pub. Date: Oct. 17, 2013

(65) Prior Publication Data
US 2015/0073750 A1    Mar. 12, 2015

Related U.S. Application Data

(60) Provisional application No. 61/622,110, filed on Apr. 10, 2012.

(51) Int. Cl.
*G06F 11/30* (2006.01)
*G01J 1/02* (2006.01)
*H05B 37/02* (2006.01)

(52) U.S. Cl.
CPC ........ *G01J 1/0228* (2013.01); *H05B 37/0254* (2013.01); *H05B 37/0272* (2013.01)

(58) Field of Classification Search
CPC   G01J 1/0228; H05B 37/0254; H05B 37/0272
(Continued)

(56) References Cited

U.S. PATENT DOCUMENTS

| 9,245,426 B2 * | 1/2016 | Caicedo Fernandez | G08C 15/06 |
| 9,474,138 B2 * | 10/2016 | Denteneer | H05B 37/03 |

FOREIGN PATENT DOCUMENTS

| CN | 102301827 A | 12/2011 |
| JP | 2002509324 A | 3/2002 |

(Continued)

*Primary Examiner* — An Do

(57) ABSTRACT

A method and system for monitoring sensors of a lighting control system. The method comprises performing a training of a plurality of sensors of the lighting control system (210) to determine a joint probability distribution function (PDF) of the illuminance at a given time t; collecting parameters from the training and storing the parameters in a prior data storage (S212); observing illuminance of the plurality of sensors (S222); determining if there is at least a faulty sensor from among the plurality of sensors based in part on the parameters stored prior data storage (S224); and locating a faulty sensor based on the determination of the existence of the at least a faulty sensor and the prior data (S232, S234).

15 Claims, 7 Drawing Sheets

(58) Field of Classification Search
USPC .......................................... 702/127, 182, 183
See application file for complete search history.

(56) References Cited

FOREIGN PATENT DOCUMENTS

| | | |
|---|---|---|
| JP | 2009158183 A | 7/2009 |
| WO | 9932856 A1 | 7/1999 |
| WO | 2010086757 A1 | 8/2010 |

* cited by examiner

FAULT DETECTION, LOCALIZATION AND PERFORMANCE MONITORING OF PHOTOSENSORS FOR LIGHTING CONTROLS

CROSS-REFERENCE TO PRIOR APPLICATIONS

This application is the U.S. National Phase application under 35 U.S.C. §371 of International Application No. PCT/IB2013/052698, filed on Apr. 4, 2013, which claims the benefit of U.S. Provisional Patent Application No. 61/622,110, filed on Apr. 10, 2012. These applications are hereby incorporated by reference herein.

The invention generally relates to lighting control, and more particularly to monitoring the performance of sensors in lighting control systems.

The proliferation of advanced lighting controls in general, and the use of networked systems for such controls in particular, is expected to increase. Such demand is fuelled by an increase in awareness of issues relating to energy savings, reducing the ecological impact footprint, utilizing government incentives, and the desire to meet certain building performance goals and industry certificates, such as a certificate for Leadership in Energy and Environment Design (LEED).

As a result of the demand for such advances, the complexity of lighting control systems is migrating from simple light switches to more advanced complex systems that incorporate multiple subsystems. Maintaining optimum performance of these advanced lighting control systems requires, in part, the use of advanced strategies that have not been commonly applied to lighting control systems in the past.

One critical performance aspect of a lighting control system is the performance of its sensors, for example, light sensors. The performance of such sensors needs to be monitored to ensure that they properly operate. Abnormal or defective sensors clearly affect the performance of the advanced lighting control system, leading to lost opportunities and hampering savings. Light sensor abnormalities could be due to multiple sources including, for example, user tampering, dust on the surface of the sensor, electronic degradation, change of the reflective environment, communication problems, and so on. A light sensor that fails to operate according to its calibrated performance compromises the overall lighting control system performance. Typically, such problems are not noticed, or are attributed to the performance of the lighting control system. Currently there is no available solution to determine if problems in a lighting system are attributable to a light sensor that is faulty and needs replacement, repair, and even self- or manual calibration. This is a major disadvantage since users of such lighting systems tend to disable such systems when the overall performance is compromised, thus increasing the power consumption.

Therefore, it would be advantageous to provide a lighting control system having a solution for detection of faults of at least light sensors. It would be further advantageous if the solution would allow corrective actions that can be taken either automatically or by, for example, a building operator, as soon as a problem is detected.

Certain embodiments disclosed herein include a system for monitoring sensors of a lighting control system. The system comprises a plurality of sensors connected to a network; and a computing device connected to the network comprising a training subsystem, a detecting subsystem and a locating subsystem, wherein the training subsystem is configured to determine an optimum operation of the system, wherein the detecting subsystem is configured to collect measurements from the plurality of sensors and determine, based in part on data provided from at least the training subsystem, a faulty sensor from among the plurality of sensors, and wherein the locating subsystem is configured to determine a location of the faulty sensor from among the plurality of sensors based on a fault indicator determined for each of the plurality of sensors.

Certain embodiments disclosed herein also include an apparatus in a lighting control system for monitoring sensors therein. The apparatus comprises an interface to a network for at least collecting data from a plurality of sensors connected to the network; a fault detection unit that includes a training subsystem, a detecting subsystem and a locating subsystem, wherein the training subsystem is configured to determine an optimum operation of the lighting control system, wherein the detecting subsystem is configured to collect measurements from the plurality of sensors and to determine, based in part on data provided from at least the training subsystem, if there is a faulty sensor from among the plurality of sensors, and wherein the locating subsystem is configured to determine the location of the faulty sensor from among the plurality of sensors based on a fault indicator determined for each of the plurality of sensors; and a storage component for storing data respective of at least one of the training subsystem, the detecting subsystem and the locating subsystem.

Certain embodiments disclosed herein also include a method for monitoring sensors of a lighting control system. The method comprises performing a training of a plurality of sensors of the lighting control system to determine a joint probability distribution function (PDF) of the illuminance at a given time t; collecting parameters from the training and storing the parameters in a prior data storage; observing illuminance of the plurality of sensors; determining if there is at least a faulty sensor from among the plurality of sensors based in part on the parameters stored prior data storage; and locating a faulty sensor based on the determination of the existence of the at least a faulty sensor and the prior data.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
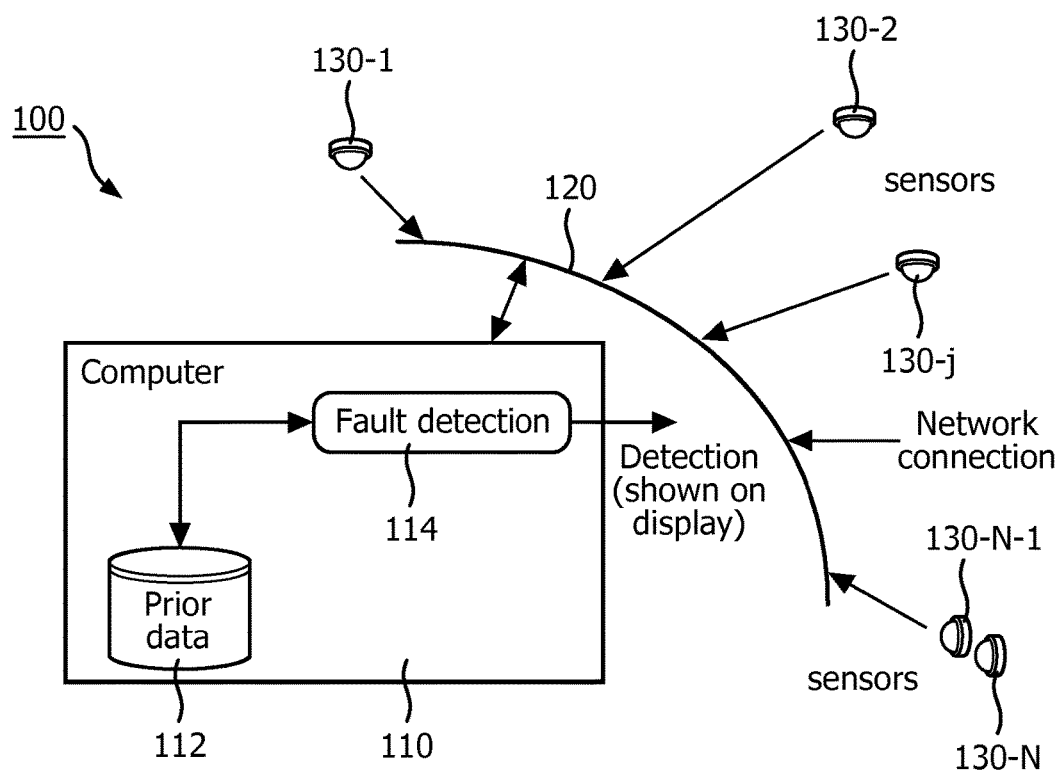
FIG. 1 is a schematic diagram of a lighting control system according to an embodiment of the invention.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

According to various embodiments discussed herein, the inherent correlation of multiple sensors of a lighting control system, as well as the correlation of a single sensor over a period of time, provide advantages over existing systems. To this end, historical data is collected from the sensors of a lighting control system. Such data may be collected over a network to which the sensors are connected. Once data is collected several steps are taken in order to determine the operational status of each sensor and possible corrective action thereto.

FIG. 1 depicts an exemplary and non-limiting schematic diagram of a lighting control system 100 according to an embodiment of the invention. A plurality of sensors 130-1 through 130-N (where N is an integer number greater than 1) and collectively referred to as sensors 130, are coupled to a network 120. The network 120 may comprise a serial bus, parallel bus, a local area network (LAN), a wide area network (WAN), and the like, whether wireless or wired, and any combinations thereof. To the network 120 there is connected a computer system 110, through a network interface, that comprises, for example, computational circuits and processors typical of such systems, a data storage 112 for the storage of the historical data respective of the sensors 130, and a fault detection unit 114. In an embodiment, the sensors 130 are photosensors.

The fault detection unit 114 includes a series of instructions embedded in a tangible computer readable medium that when executed by the computer 110 performs the steps for detection and location as discussed in greater detail herein below. The fault detection unit 114 may also include a display or other means for showing the results of the processing performed by the computer system 110.

The fault detection unit 114 performs a training operation, a fault detection operation, and a fault localization operation. In the training operation, some statistics are computed for a group of sensors 130 over a portion of the historical data contained in the storage 112. Such statistics include a classification of historical data into groups, and estimation of the statistical variables of each group, i.e., the parameters of the joint distribution function, for example but not by way of limitation, mean, variance, and/or covariance.

In the fault detection operation, a process takes place where for each time event or each duration of time (e.g., a 30 minute span) and for a particular reading from a set of sensors 130, the computer system 110 computes the probability that the currently measured data is correct or otherwise likely to occur given prior sensor measurement relationships, i.e., a correlation is determined. If the probability is low, then the computer system 110 can identify this measurement event as problematic or faulty. A fault is viewed as an event with negligible probability, i.e., an event that is unlikely to happen, expressed as:

$$Pr(x(t)=x|t=n) \approx 0$$

where x(t) is the reading of a set of the sensors 130 being checked. In the fault localization operation, an attempt is made to locate the sensor or sensors which are faulty.

This operation is based on an evaluation of the likelihood of the measurement from a certain sensor. Once the faulty sensor(s) from the sensors 130 are identified, the faulty sensor(s) can be flagged as such for further investigation. Such investigation may be manual, where a building operator can investigate the cause of the performance deviation and correct the problem of such faulty sensors. Alternatively, one or more self-calibration operation can also be undertaken when possible, for example, by initiating a self-calibration process by the computer system 110 causing a faulty sensor of the sensors 130 to perform self-calibration. Self-calibration algorithms are not discussed herein. According to one embodiment, faults or abnormalities are identified in measurement data received from the sensors 130 with the following properties: low probability of false alarm; and, low probability of misdetection.

A faulty sensor is a sensor providing abnormal measurement data, which may be attributable to various reasons, for example, user tampering, dust on the surface of the sensor, electronic degradation, change of the reflective environment, communication problems, and so on. A faulty sensor is not limited to an actual failure of the sensor.

An effective estimation of the joint distribution of illuminance/luminance measured by sensors (hereinafter, without loss of generality, the term daylight illuminance may be used) is key to design an effective fault detection system. For the purpose of illustration, a Gaussian mixture model is selected to describe the joint probability distribution function (PDF) of the daylight illuminance. That is, the PDF of the daylight illuminance is approximated by a superposition of multiple Gaussian distributions. Therefore, the following information of the Gaussian mixture model is required to be determined: the optimum number of Gaussian distribution components at a given time t; the mean vector and the covariance matrix for each Gaussian distribution; and, the proper weight for each Gaussian distribution when combined. Hence, for a given time t, the optimum number of Gaussian distribution components is denoted as $L^*(t)$, and denotes the mean vector, the covariance matrix, and the weight for the $k^{th}$ Gaussian distribution as $\mu_k(t), \Sigma_k(t), \pi_k(t)$, respectively, thereby providing a joint distribution of the daylight illuminance at a given time t as:

$$p(x(t)|t, L^*(t)) = \sum_{k=1}^{L^*(t)} \pi_k(t) N(x(t)|\mu_k(t), \Sigma_k(t))$$

where x(t) is a column vector denoting the daylight illuminance, and $N(x(t)|\mu_k(t), \Sigma_k(0))$ denotes a multivariate Gaussian distribution with mean $\mu_k(t)$ and covariance $\Sigma_k(t)$. The parameter set $\{L^*(t), \mu_k(t), \Sigma_k(t), \pi_k(t)\}$ completely describes the PDF of the daylight illuminance. How to find the parameter set $\{L^*(t), \mu_k(t), \Sigma_k(t), \pi_k(t)\}$ according to one embodiment of a fault detection subsystem will be described herein below in greater detail.

Figure 2:
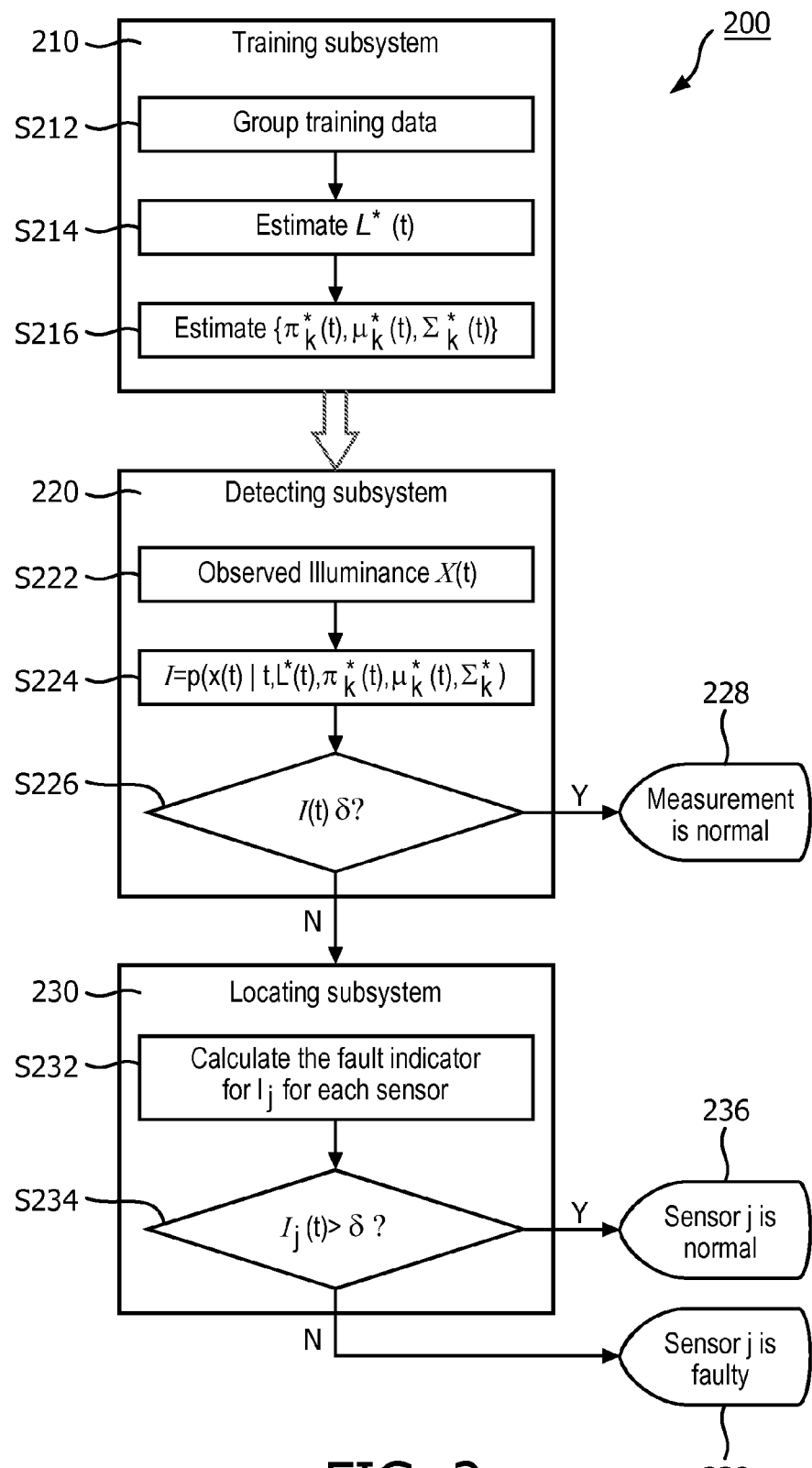
FIG. 2 is a schematic flowchart of a sensor fault detection and location system according to an embodiment of the invention.

FIG. 2 depicts an exemplary and non-limiting flowchart 200 of a sensor fault detection and location system according to an embodiment of the invention. The system 200 includes three subsystems, a training subsystem 210, a detection subsystem 220, and a fault location subsystem 230. The task of the training subsystem 210 is to estimate the joint probability density function of the daylight illuminance from the stored training data. The training subsystem 210 is typically trained off-line and provides the detecting subsystem 220 and locating subsystem 230 with the estimated model parameters used by these subsystems. The task of the detecting subsystem 220 is to detect whether or not there is a fault in the measurement from the sensors 130. Subsystem 220 runs online and tests real-time measurements based on the estimated model parameters from the training subsystem 210. Once there is a detected fault, the detecting subsystem 220 notifies the locating subsystem 230 to test the measurement from each sensor 130 and to determine which of the sensors 130 is providing the faulty measurement. The details of the subsystems 210, 220 and 230 are discussed in further detail herein below.

The training subsystem 210 shown in FIG. 2 includes three operations: S212 grouping of the training data, S214 estimation of the optimum number of Gaussian distributions L*(t) 214, and S216 estimation of $\mu_k(t), \Sigma_k(t), \pi_k(t)$.

In S212, the training subsystem 210 groups the training data according to the observation time of the data and the desired observation window length. The training data is defined as the pre-stored normal daylight illuminance measured from functional sensors of the sensors 130. The observation time is the time instance when the daylight illuminance is measured. The observation window length is the time duration to discretize the originally continuous time information. For instance, if the observation window length is 30 minutes, all the daylight illuminance measurements with the 30 minute time interval are grouped together and viewed as following the same PDF. In S214, the training subsystem 210 determines the optimum number of Gaussian distribution components. To find L*(t) is equivalent to finding the optimum number of clusters to describe the daylight illuminance, the clusters being described in greater detail herein below.

Figure 3:
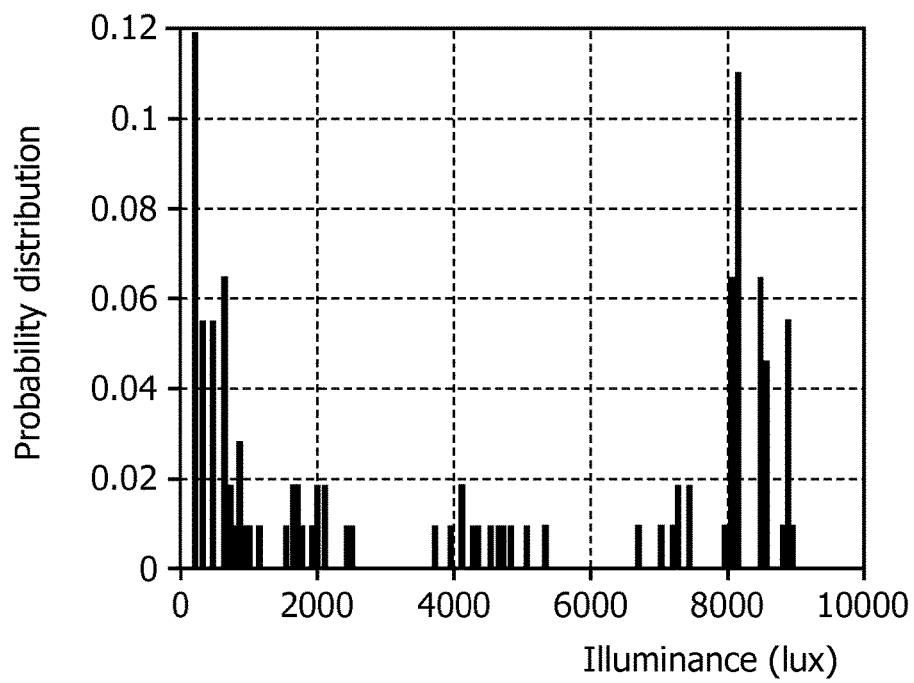
FIG. 3 is a graph showing the illuminance distribution of illuminance data gathered from a west-facing window in a typical room.

FIG. 3 is an exemplary and non-limiting graph showing the illuminance distribution of illuminance data gathered during 16:00-16:01 from, for example, a west-facing window in a typical room, from a single sensor of the sensors 130. By simply observing FIG. 3, it is readily understood that the data can be roughly grouped into several clusters based on the illuminance levels. The optimum number of clusters is defined herein as the number of clusters that properly describes that data without inducing excessive model complexity. For instance, three clusters is a better choice to describe the illuminance data in FIG. 3 compared to a partition into ten different clusters. For example, an X-means algorithm is utilized in this step to find L*(t).

Figure 4:
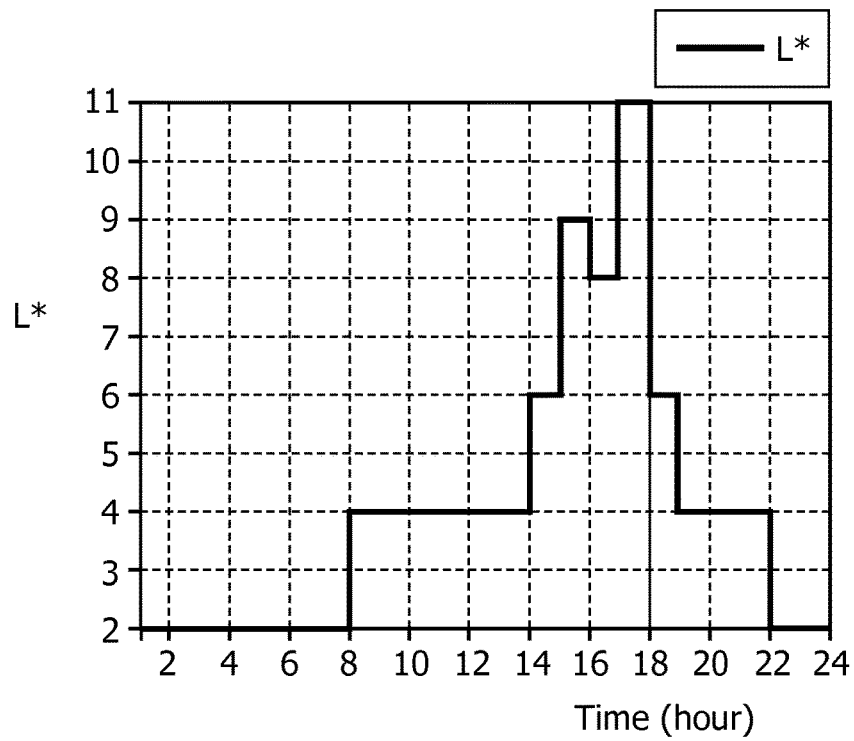
FIG. 4 is a graph showing the optimum number of clusters of the illuminance data based on a 60-min observation window.

FIG. 4 is an exemplary and non-limiting diagram of the result of the L*(t) for the west-facing room. From FIG. 4, it is understood that the optimum number of clusters of the illuminance varies over time based on the daylight availability. For example, during night time, when there is no daylight, the optimum number of clusters is only 2; while between 15:00 and 18:00 hours, when there is direct sunlight for the west-facing room, the optimum number of clusters is between 8 and 11. It should be further noted that the optimum number of clusters of the illuminance also depends on the observation window length and the environment of the building.

Returning to FIG. 2, in S216 it is necessary to find the parameter set $\mu_k(t), \Sigma_k(t), \pi_k(t)$ based on L*(t) found in S214, where $1 \leq k \leq L^*(t)$ and $\pi_k(t)$ satisfies:

$$0 \leq \pi_k(t) \leq 1$$

$$\sum_{k=1}^{L^*(t)} \pi_k(t) = 1$$

The optimal parameter set is defined herein as the maximum likelihood solution, i.e., $$\{\pi_k^*(t), \mu_k^*(t), \Sigma_k^*(t)\} = \arg\max \sum_{i=1}^{N} \ln\left\{\sum_{k=1}^{L(t)} \pi_k(t) N(x^i(t) \mid \mu_k(t), \Sigma_k(t))\right\}$$

Although there is no closed form to find the optimal $\mu_k(t), \Sigma_k(t), \pi_k(t)$, an efficient expectation-maximization (EM) algorithm can be directly applied to find the solution.

Figure 5:
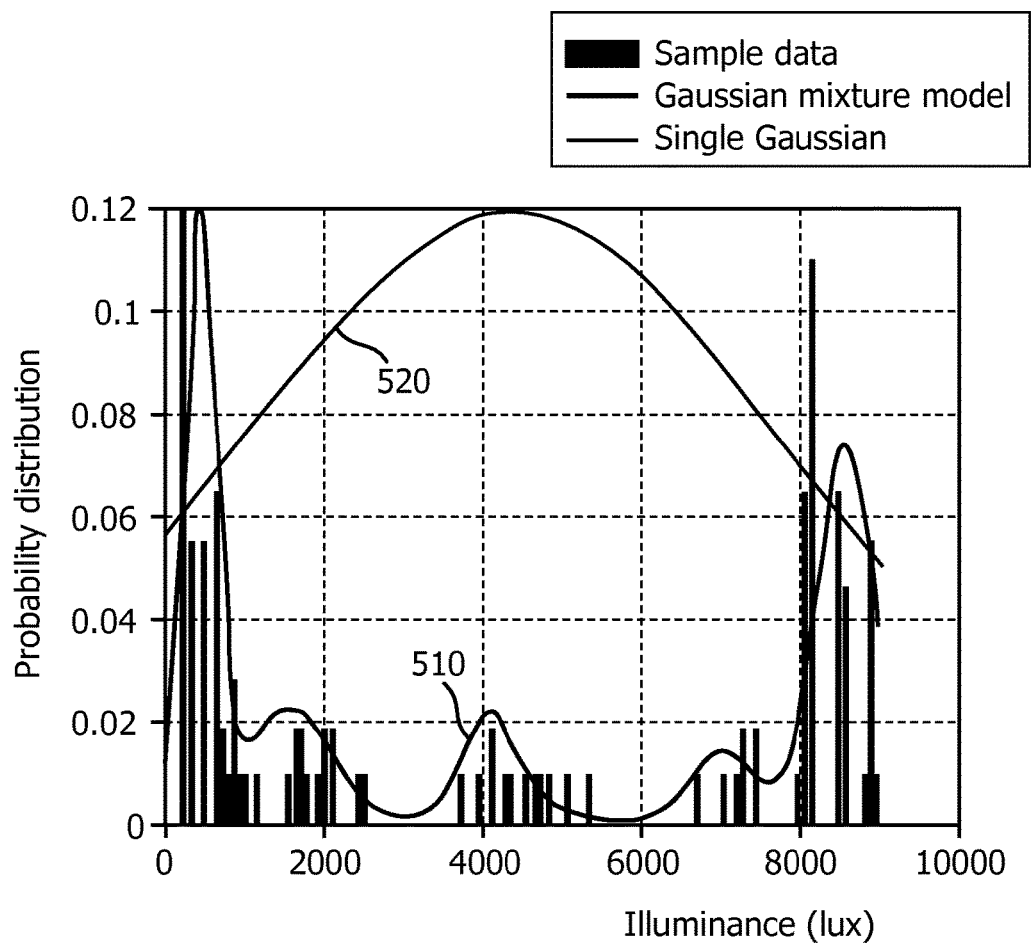
FIG. 5 is a graph showing the comparison of the estimated joint probability distribution functions (PDF) of the daylight illuminance near for example, a window of a typical room (based on Gaussian mixture model and signal Gaussian model)
Figure 6:
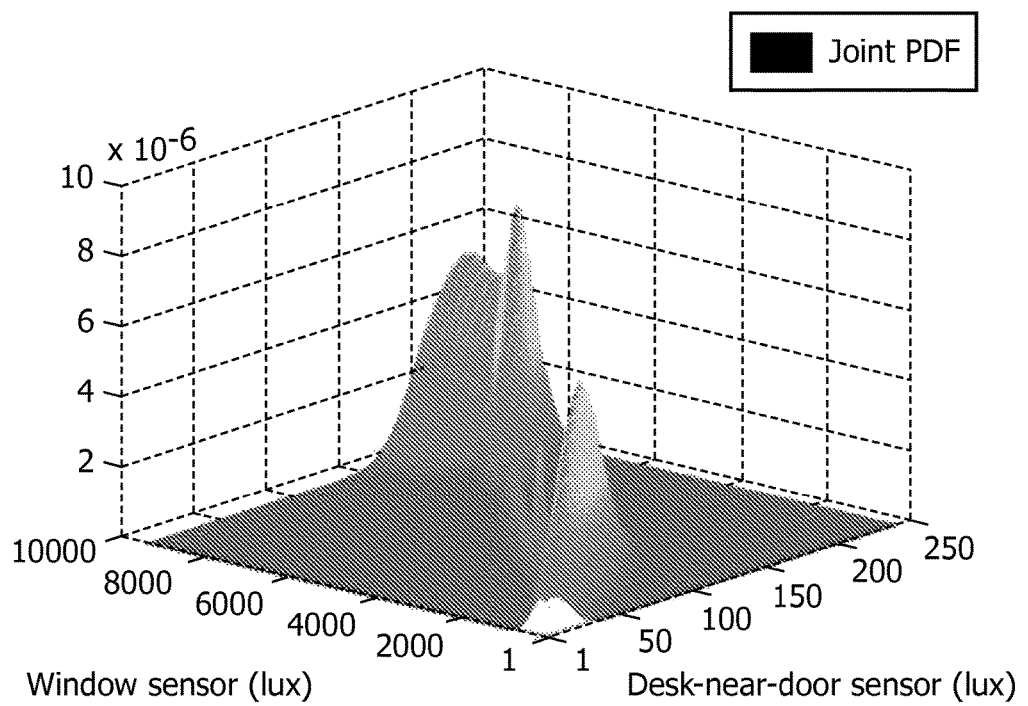
FIG. 6 is a graph showing the estimated joint PDF of the daylight illuminance near for example, a window and the desk near the door of a typical room based on Gaussian mixture model.

FIG. 5 shows an exemplary and non-limiting graph comparing the estimated PDFs of the daylight illuminance near the west-facing window of a typical room (shown as a red solid curve 510) during 16:00-16:01 (1-min observation window) based on a Gaussian mixture model and the traditional single Gaussian model (curve 520). Compared with the traditional single Gaussian distribution assumption 520, the Gaussian mixture model 510 describes the daylight illuminance much more accurately and clearly embodies the multimodal nature of the daylight illuminance distribution. Another example of the Gaussian mixture model for two daylight measurements is shown in FIG. 6. Specifically, FIG. 6 provides a graph showing the estimated joint PDF of the daylight illuminance near the west-facing window and at a desk near the door of a typical room during 16:00-16:01 (1-min observation window) based on a Gaussian mixture model with two measurements.

Returning to FIG. 2, once the system has been trained by the training subsystem 210, the detecting subsystem 220 receives in S222 a new incoming observation x(t) for which a respective probability density is determined in S224 based on the previously found parameter sets:

$$I(t) = p(x(t) \mid t, L^*(t), \pi_k^*(t), \mu_k^*(t), \Sigma_k^*(t))$$

Thereafter, in S226 the probability density is compared with a predefined threshold δ value based on the following simple detection rule:

$$\begin{cases} I(t) > \delta & x(t) \text{ is a normal observation} \\ I(t) \leq \delta & x(t) \text{ is a faulty observation} \end{cases}$$

That is, if I(t)>δ then the observation is displayed in S228 as normal. However, if I(t)≤δ then the observation is faulty and processing continues by the locating subsystem 230 to determine which of the sensors 130 is a faulty sensor.

Lastly, the locating subsystem 230 evaluates the measurement and locates the faulty sensor(s) of the sensors 130. As shown in FIG. 2, the faulty sensors are located by examining their fault indicator $I_j(t)$ 230, where j represents the number of sensor 130-j. The fault indicator according to the invention is defined as an evaluation of the likelihood of the measurement from a certain sensor. The fault indicators can be different functions as long as they can reflect the likelihood of the measurement. For instance, the fault indicator of sensor j can be the following conditional probability density:

$$I_j(t)=p(x_j(t)|x_i(t),t,L^*(t),\pi_k^*(t),\mu_k^*(t),\Sigma_k^*(t)), \forall i\neq j, 1\leq i\leq D$$

where D is the total number of sensors. As another example, the fault indicator can be determined as the marginal probability density of the sensor j:

$$I_j(t) = p(x_j(t) | t, L^*(t), \pi_k^*(t), \mu_k^*(t), \Sigma_k^*(t))$$
$$= \sum_{k=1}^{L^*(t)} \pi_k^*(t) N(x_j(t) | \mu_{k,j}^*(t), \Sigma_{k,j,j}^*(t))$$

where $\mu_{k,j}^*(t)$ represents the $j^{th}$ element of the vector $\mu_k^*(t)$, and $\Sigma_{k,j,j}^*(t)$ represents the element on the $j^{th}$ row and the $j^{th}$ column of the matrix $\Sigma_k^*(t)$. Thus in this case each component of the Gaussian mixture model becomes a single variate Gaussian. Once the fault indicator for each individual sensor is calculated, as shown above or otherwise, the rule of determining whether or not sensor j has an error is determined simply by comparing $I_j(t)$ with a predetermined threshold $\delta_j$ as follows:

$$\begin{cases} I_j(t) > \delta & \text{sensor } j \text{ is normal} \\ I_j(t) \leq \delta & \text{sensor } j \text{ has fault} \end{cases}$$

that is, the sensor j is determined to be operating normally if $I_j(t)$ is larger than $\delta_j$ 236, and is determined to be faulty 238 otherwise. In an embodiment, the status of each sensor 130 may be displayed by the computer 110. It should be understood that the thresholds for fault detecting and locating need not to be the same. The appropriate values of the thresholds can be obtained from the training data. For example, if the fault indicator is the marginal probability density, the threshold can be found as:

$$\delta = \eta \min_{x(t)} p(x(t) | t, L^*(t), \pi_k^*(t), \mu_k^*(t), \Sigma_k^*(t))$$
$$\delta_j = \eta \min_{x_j(t)} \sum_{k=1}^{L^*(t)} \pi_k^*(t) N(x_j(t) | \mu_{k,j}^*(t), \Sigma_{k,j,j}^*(t))$$
$$\forall x(t) \text{ in training data set}$$

where $\eta$ is a scalar, e.g. $10^{-2}$, to provide a margin for the fault detection by the subsystems 220 and 230.

Figure 7:
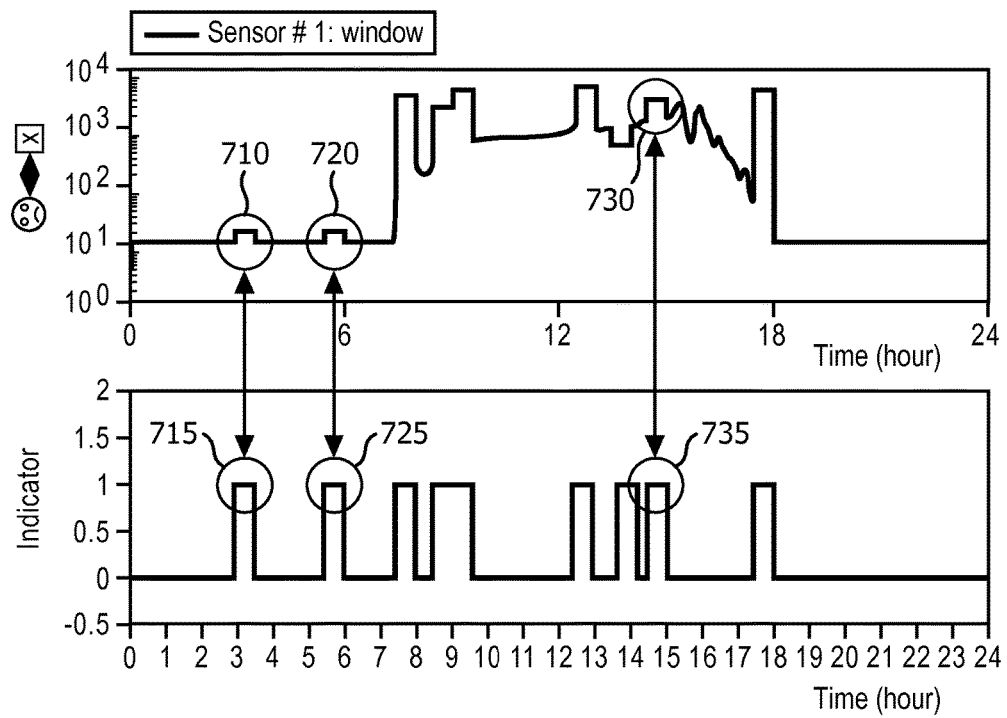
FIG. 7 is a timing diagram demonstrating the fault detection system testing the illuminance from for example, a typical dining room.
Figure 8:
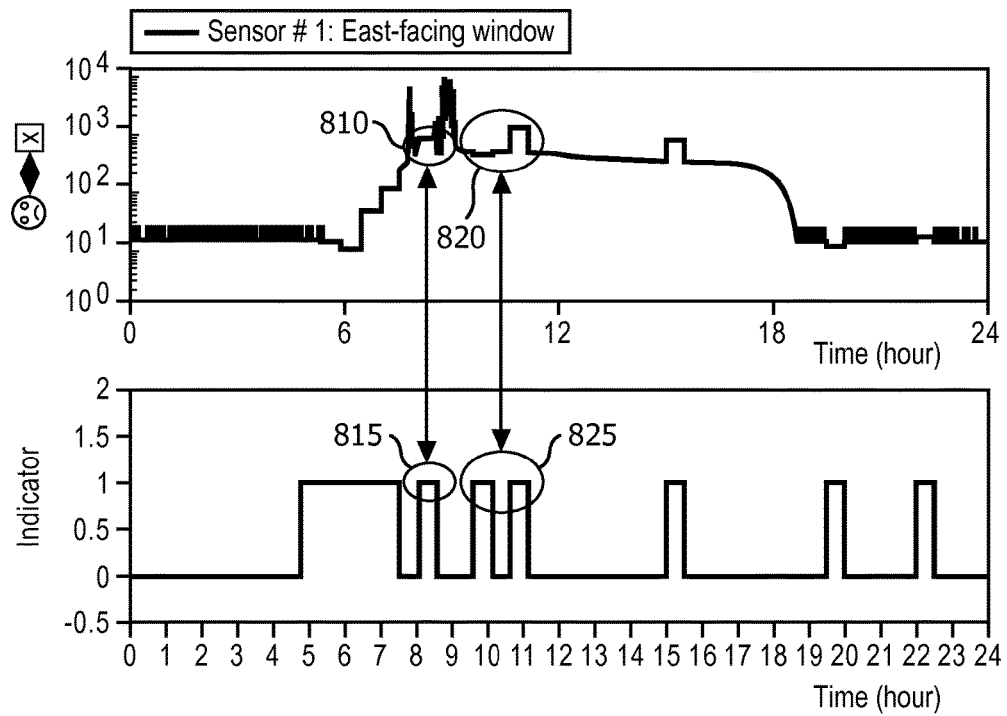
FIG. 8 is a timing diagram demonstrating the fault detection system testing the illuminance from for example, a typical office room.
Figure 9:
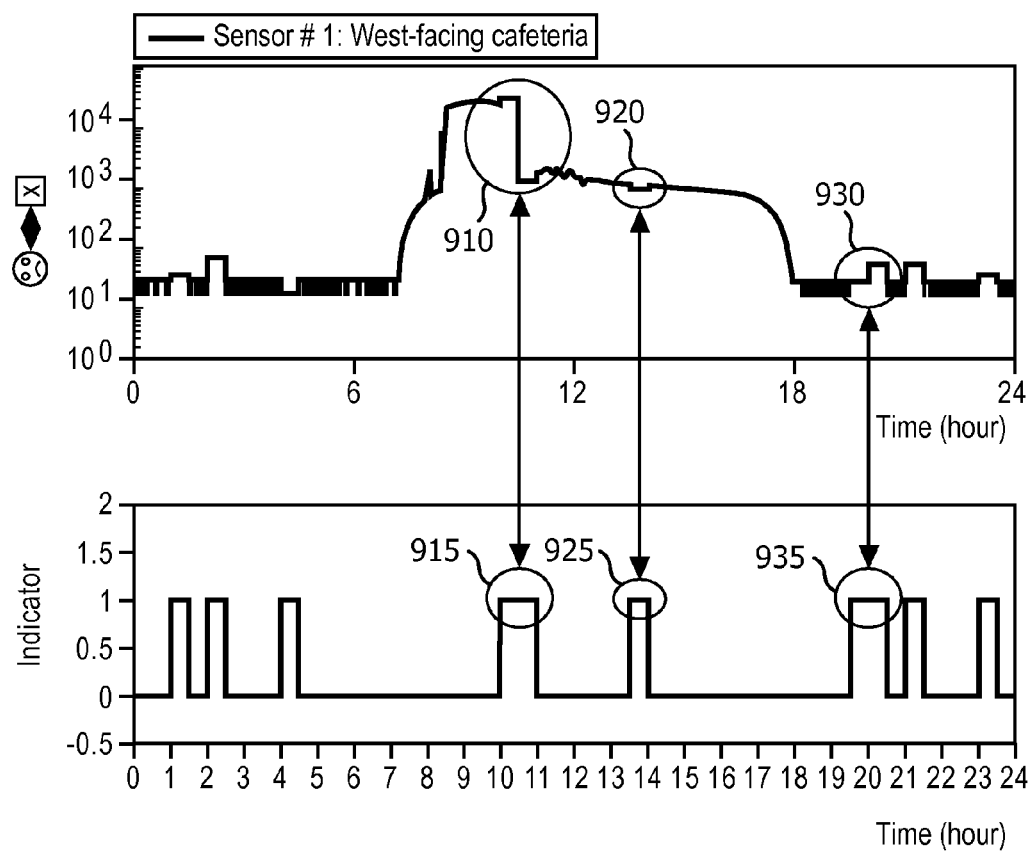
FIG. 9 is a timing diagram demonstrating the fault detection system testing the illuminance from for example, a typical cafeteria room.

The following discussions relating to FIGS. 7-9 illustrate by non-limiting examples, the operation of a lighting system according to various embodiments of the invention. For this illustrative purpose, three different environments are discussed: a dining room (FIG. 7), an office room (FIG. 8), and a building hallway (FIG. 9). The sample rate for all the sensors in the experiments is 1 sample/minute. The observation window length is 1 minute. There are five sensors deployed in the dining room, thirteen sensors deployed in the office room, and four sensors deployed in the building hallway. These sensors are placed at various locations. In the case of the office room and dining room, the sensors are located at the ceiling, table/desks and window. In the case of the hallway, sensors are located on the windows at different locations along the hallway.

FIG. 7 provides an exemplary and non-limiting timing diagram demonstrating the fault detection and locating system testing the illuminance from a typical dining room mentioned above. In this example, training data was collected over a period of 28 days and the measurements from all 5 sensors are used to train the fault detection and locating system. In this example nine artificial faulty periods of 30-minutes are randomly inserted into the illuminance data. During each faulty period, the sensor measuring the illuminance through the window (denoted by "sensor #1: window" in FIG. 7) is assumed to have fault.

The graph at the top of FIG. 7 shows the illuminance data with inserted faulty measurements. The graph at the bottom of FIG. 7 shows the output of the detection performed by subsystems 220 and 230, when there is a detected fault the output is 1, otherwise, the output is 0. The threshold is set based on a fault indicator that is the marginal probability density.

By effectively exploiting the correlation between different illuminance measurements, the fault detection subsystem 220 is able to detect the faulty measurements even if they are close to a normal measurement. For example, the faulty measurements highlighted in circles 710, 720 and 730 are similar to the normal measurements; however, the subsystems 220 and 230 detect the slight abnormality as indicated by the respective circles 715, 725 and 735.

FIG. 8 provides an exemplary and non-limiting timing diagram demonstrating the operation of system 100 testing the illuminance from, for example, a typical office room having 13 sensors. In this example training data collected over a period of 30 days and the measurements from all 13 sensors are used to train the fault detection and locating system. Again nine artificial faulty periods of 30-minutes are randomly inserted into the illuminance data. During each faulty period, the sensor measuring the illuminance through the window (denoted by "sensor #1: east-facing window" in FIG. 8) is assumed to have fault. The graph at the top of FIG. 8 shows the illuminance data with inserted faulty measurements.

The graph at the bottom of FIG. 8 shows the output of the subsystems 220 and 230; when there is a detected fault the output is 1, otherwise the output is 0. The threshold is set based on a fault indicator that is the marginal probability density. By effectively exploiting the correlation between different illuminance measurements, the fault detection system is able to detect the faulty measurements even if they are close to the normal measurement. For example, the faulty measurements highlighted in circles 810 and 820 are similar to normal measurements; however, the detector detects the slight abnormality as indicated by the respective circles 815 and 825.

FIG. 9 provides an exemplary and non-limiting timing diagram demonstrating a fault detection system testing the illuminance from, for example, a building hallway having four sensors. In this example training data collected over a period of 30 days and the measurements from all four sensors are used to train the fault detection and locating system. Again, nine artificial faulty periods of 30-minutes are randomly inserted into the illuminance data. During each faulty period, the sensor measuring the illuminance through a window (denoted by "sensor #1: west-facing cafeteria" in FIG. 9) is assumed to have a fault. The graph at the top of FIG. 9 shows the illuminance data with inserted faulty measurements.

The graph at the bottom of FIG. 9 shows the output of the subsystems 220 and 230; when there is a detected fault the output is 1, otherwise the output is 0. The threshold is set based on a fault indicator that is the marginal probability density. By effectively exploiting the correlation between different illuminance measurements, the fault detection system is able to detect the faulty measurements even if they are close to the normal measurement. For example, the faulty measurements highlighted in circles 910, 920 and 930 are similar to normal measurements; however, the detector is still able to detect the slight abnormality as indicated by the respective circles 915, 925 and 935.

The various embodiments disclosed herein can be implemented as hardware, firmware, software or any combination thereof. Moreover, the software is preferably implemented as an application program tangibly embodied on a program storage unit, a non-transitory computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A system for monitoring sensors of a lighting control system, comprising:
    a plurality of sensors connected to a network; and
    a computing device connected to the network comprising a training subsystem, a detecting subsystem and a locating subsystem, wherein the training subsystem is configured to compute statistics for the plurality of sensors over at least a portion of historical data respective of the alit of sensors stored over time, wherein the detecting subsystem is configured to collect measurements from the plurality of sensors and determine, based at least on the computed statistics provided from the training subsystem, a faulty sensor from among the plurality of sensors, and wherein the locating subsystem is configured to determine a location of the faulty sensor from among the plurality of sensors based on a fault indicator determined for each of the plurality of sensors.

2. The system of claim 1, wherein the sensors are photosensors.

3. The system of claim 1, wherein the training subsystem determines a joint probability distribution function (PDF) of the illuminance at a given time t.

4. The system of claim 1, wherein the detecting subsystem determines a probability density.

5. The system of claim 4, wherein the detecting subsystem compares the probability density to a predefined threshold value to determine if there is a faulty sensor of the plurality of sensors.

6. The system of claim 1, wherein the locating subsystem compares for each sensor its respective probability density to a respective predefined threshold value to determine if each sensor is faulty or not.

7. An apparatus in a lighting control system for monitoring sensors therein, comprising:
    an interface to a network for at least collecting data from a plurality of sensors connected to the network;
    a fault detection unit that includes a training subsystem, a detecting subsystem and a locating subsystem, wherein the training subsystem is configured to compute statistics for the plurality of sensors over at least a portion of historical data respective of the plurality of sensors stored over time, wherein the detecting subsystem is configured to collect measurements from the plurality of sensors and to determine, based at least on the computed statistics provided from the training subsystem, if there is a faulty sensor from among the plurality of sensors, and wherein the locating subsystem is configured to determine the location of the faulty sensor from among the plurality of sensors based on a fault indicator determined for each of the plurality of sensors; and
    a storage component for storing data respective of at least one of the training subsystem, the detecting subsystem and the locating subsystem.

8. The apparatus of claim 7, wherein the sensors are photosensors.

9. The apparatus of claim 7, wherein the training subsystem determines a joint probability distribution function (PDF) of the illuminance at a given time t.

10. The apparatus of claim 7, wherein the detecting subsystem is further configured to determine a probability density.

11. The apparatus of claim 10, wherein the detecting subsystem is further configured to compare the probability density to a predefined threshold value to determine if there is a faulty sensor among the plurality of sensors.

12. The apparatus of claim 11, wherein the locating subsystem is further configured to compare for each sensor its respective probability density to a respective predefined threshold value to determine if each sensor is faulty or not.

13. A method for monitoring sensors of a lighting control system, comprising:
    performing a training of a plurality of sensors of the lighting control system to determine a joint probability distribution function (PDF) of the illuminance at a given time t;
    collecting parameters from the training and storing the parameters in a prior data storage;
    observing illuminance of the plurality of sensors;
    determining if there is at least a faulty sensor from among the plurality of sensors based in part on the parameters stored prior data storage; and
    locating a faulty sensor based on the determination of the existence of the at least a faulty sensor and the prior data.

14. The method of claim 13, wherein collecting parameters from the training further comprises:
    determining an optimum number of Gaussian distribution components.

15. The method of claim 13, wherein determining if there is a faulty sensor comprises:
   determining a probability density.

* * * * *